No. 827,160. PATENTED JULY 31, 1906.
F. A. LANE.
TEAT CUP FOR MILKING MACHINES.
APPLICATION FILED NOV. 1, 1905.
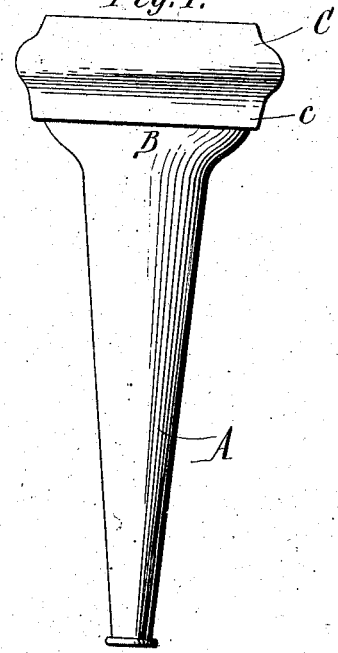
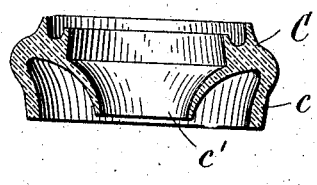
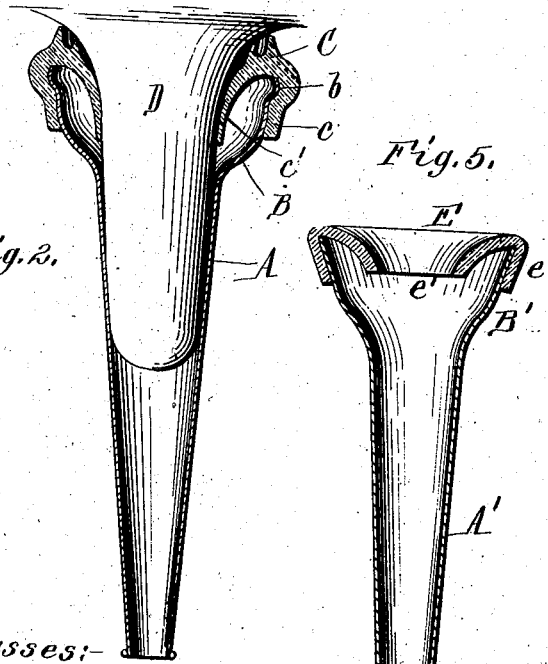
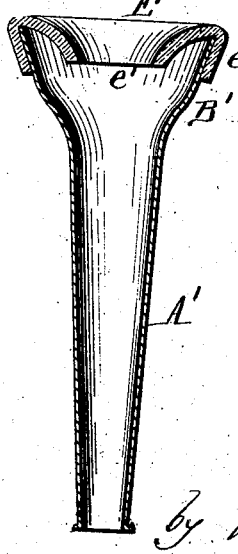
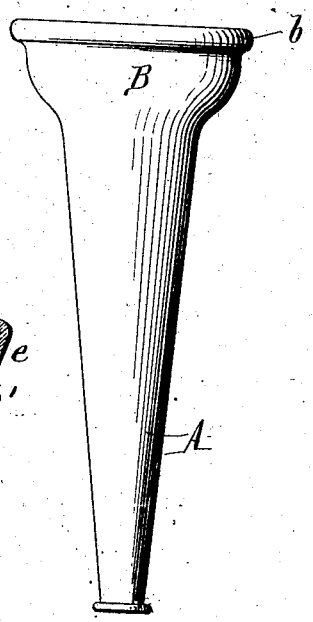
Witnesses:—
R. W. Rumer.
E. A. Volk.
Inventor,
Frederic A. Lane,
by Wilhelm, Parker & Hard
Attorneys.

UNITED STATES PATENT OFFICE.

FREDERIC A. LANE, OF LITTLE FALLS, NEW YORK, ASSIGNOR TO D. H. BURRELL & COMPANY, OF LITTLE FALLS, NEW YORK.

TEAT-CUP FOR MILKING-MACHINES.

No. 827,160.     Specification of Letters Patent.     Patented July 31, 1906.

Application filed November 1, 1905. Serial No. 285,403.

*To all whom it may concern:*

Be it known that I, FREDERIC A. LANE, a citizen of the United States, residing at Little Falls, in the county of Herkimer and State of New York, have invented a new and useful Improvement in Teat-Cups for Milking-Machines, of which the following is a specification.

This invention relates to that class of teat-cups which are used in connection with a suction apparatus and which are tapering in form and made of rigid material—for instance, metal or glass. Teat-cups of this character have been provided near the large end with elastic or flexible washers which project inwardly from the wall of the cup and make an air-tight joint with the teat and prevent air from being drawn into the cup by the suction; but such washers hold the side of the teat away from the inner side of the cup. This results in leaving a considerable part of the teat unsupported, and this causes the blood to settle in the teat under the action of the suction, and that in turn checks the free flow of the milk and prevents the animal from being milked dry.

The object of my invention is to construct the cup in such manner that this difficulty is overcome and the teat is fully and properly supported and the suction is applied in such manner that the animal is milked dry.

In the accompanying drawings, Figure 1 is a side elevation of a teat-cup provided with my improvement. Fig. 2 is a sectional elevation of the same, showing the cup applied to the teat. Fig. 3 is a detached sectional elevation of the flexible mouthpiece. Fig. 4 is a detached side elevation of the cup. Fig. 5 is a sectional elevation showing a simplified constructon of the cup and mouthpiece.

Like letters of reference refer to like parts in the several figures.

A represents the tapering body of the cup, having at its small lower end a bead, nipple, or other suitable provision for connection with the suction-pipe of a milking-machine. The form and size of this body are such that the teat is supported therein from the tip nearly to the base. As teats differ considerably in size and form in different cows, these tapering bodies are made of different sizes, so as to approximately fit the teat with which they are designed to be used. It is preferred to make the tapering body slightly smaller than the teat, so that the latter is slightly compressed by the cup. This insures that the teat is properly supported throughout the length of the tapering part of the cup.

B, Figs. 1 to 4, represents an annular enlargement or top chamber formed at the large end of the tapering body of the cup and having its wall extending outwardly and upwardly therefrom and provided at its upper edge with a hollow bead or rim $b$ for the attachment of the flexible mouthpiece C. The latter is preferably made of soft india-rubber and comprises an outer annular attaching-wall $c$, which is sprung over the top head or rim $b$, and an inner annular packing-curtain $c'$, which depends from the top of the mouthpiece into the cavity of the top chamber, extending outwardly and upwardly from the large end of the tapering body. This mouthpiece bears with its top and its inner curtain $c'$ against the base or upper portion of the teat D near the junction of the latter with the udder. The hollow chamber or cavity of the outward enlargement at the top of the tapering body of the cup accommodates this curtain and permits the same to bear snugly against the teat without exerting a harmful pressure and at the same time permits of a certain amount of lateral as well as up-and-down motion, which enables the mouthpiece and the body of the cup to adapt itself nicely to the teat. The inner curtain of the mouthpiece forms a yielding continuation of the tapering body of the teat-cup and supports the teat snugly above the large end of the tapering body of the cup. The teat is supported at its side practically throughout its entire length from the tip to the base, and congestion in any part of the teat is avoided. All interference with the flow of the milk is thereby avoided, and a complete dry milking of the animal is effected.

In the simplified construction represented in Fig. 5 the annular chamber B' at the top of the tapering body A' is made steeper than in the construction shown in Figs. 1, 2, and 4, whereby the tendency of solid matter to lodge in the chamber is greatly reduced. The shape of the mouthpiece E is somewhat simpler than that of the mouthpiece C, since it comprises a plain outer wall $e$ and an inner wall $e'$, which is shorter than the outer wall, whereby the molding of the mouthpiece is facilitated.

A cup of this construction applied to a suction-pipe in which vacuum pulsations are maintained will have a small amount of up-and-down movement on the teat, the cup moving slightly upwardly on the teat when the suction is applied and descending slightly when the suction is relieved, without, however, becoming detached from the teat.

I claim as my invention—

A teat-cup comprising a rigid tapering body shaped to receive and support the teat and having at its large end an enlargement forming an internal annular cavity which extends outwardly and upwardly from the large end of the tapering body, and a flexible mouthpiece having an outer wall by which it is attached to said enlargement and an inner depending packing-wall which is located in said cavity above the large end of the tapering body and capable of sidewise movement in said cavity, substantially as set forth.

Witness my hand this 27th day of October, 1905.

FREDERIC A. LANE.

Witnesses:
LOOMIS BURRELL,
F. A. TINKER.